United States Patent
Shiner et al.

(10) Patent No.: US 10,097,263 B2
(45) Date of Patent: Oct. 9, 2018

(54) USER DEFINED APPLICATIONS EXECUTED ON OPTICAL MODULES FOR PERFORMANCE MONITORING IN OPTICAL NETWORKS

(71) Applicant: Ciena Corporation, Hanover, MD (US)

(72) Inventors: Andrew D. Shiner, Ottawa (CA); Andrzej Borowiec, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/408,602

(22) Filed: Jan. 18, 2017

(65) Prior Publication Data
US 2018/0205454 A1    Jul. 19, 2018

(51) Int. Cl.
*H04B 10/079* (2013.01)
*H04L 12/26* (2006.01)
*H04L 29/08* (2006.01)

(52) U.S. Cl.
CPC ....... *H04B 10/0795* (2013.01); *H04L 43/045* (2013.01); *H04L 67/26* (2013.01)

(58) Field of Classification Search
CPC ..................................................... H04B 10/07
See application file for complete search history.

(56) References Cited

U.S. PATENT DOCUMENTS

| | | | |
|---|---|---|---|
| 8,750,713 B2 | 6/2014 | Sheth et al. | |
| 2009/0003364 A1* | 1/2009 | Fendick | H04L 45/00 370/401 |
| 2011/0249967 A1* | 10/2011 | Bhoja | H04B 10/0799 398/25 |
| 2013/0051809 A1 | 2/2013 | Mehrvar et al. | |
| 2014/0133865 A1 | 5/2014 | Reimer et al. | |
| 2014/0341595 A1 | 11/2014 | Harley et al. | |
| 2016/0352429 A1* | 12/2016 | Coffey | H04B 10/40 |
| 2016/0373190 A1 | 12/2016 | Reimer et al. | |
| 2017/0134836 A1* | 5/2017 | Sindhu | H04Q 11/0066 |
| 2017/0372063 A1* | 12/2017 | Dewan | G06F 21/84 |

OTHER PUBLICATIONS

Y. Iizawa et al, "Multi-layer and Multi-domain Network Orchestration and Provision of Virtual Views to Users", 40th Annual Computer Software and Applications Conference, IEEE, 2016.*
Ciena, Enabling a Bigger and Smarter Network With Ciena's Wavelogic 3, pp. 1-5.

* cited by examiner

*Primary Examiner* — Shi K Li
(74) *Attorney, Agent, or Firm* — Clements Bernard Walker PLLC; Christopher L. Bernard; Lawrence A. Baratta, Jr.

(57) ABSTRACT

An optical module adapted to operate in an optical network to perform an optical function therein includes optical components adapted to perform one or more functions associated with the optical module; processing circuitry communicatively coupled to the optical components and adapted to obtain data generated during operation of the one or more functions; and compute resources communicatively coupled to the processing circuitry and adapted to receive an application for local execution on the compute resources in a sandboxed manner, and analyze, by the application, the data to perform one or more functions.

19 Claims, 7 Drawing Sheets

USER DEFINED APPLICATIONS EXECUTED ON OPTICAL MODULES FOR PERFORMANCE MONITORING IN OPTICAL NETWORKS

FIELD OF THE DISCLOSURE

The present disclosure generally relates to optical networking systems and methods. More particularly, the present disclosure relates to user defined applications executed on optical modules for performance monitoring in optical networks.

BACKGROUND OF THE DISCLOSURE

Conventionally, optical networking equipment is provided by vendors (i.e., manufacturers, developers, etc.) to network operators which operate the equipment to realize various networking functions at Layers 0 (photonic), 1 (Time Division Multiplexing (TDM)), 2 (packet), etc. Optical networking equipment generally includes optical transceivers (modems), optical amplifiers, multiplexers/demultiplexers, Optical Power Monitors (OPMs), Wavelength Selective Switches (WSS), etc. Optical transceivers can provide data transmission using coherent modulation and polarization multiplexing techniques to achieve transmission in excess of 100 Gbps, the optical amplifiers (e.g., Erbium-Doped Fiber Amplifiers (EDFAs), Raman amplifiers, etc.) provide reach extension, the OPMs provide channel monitoring, the multiplexers/demultiplexers combine/split channels, and WSSs or other optical switches provide optical switching. A cornerstone of optical network operation is performance monitoring to ensure optimization as well as proper operation of the network. The conventional approach to performance monitoring includes each module monitoring various data points, performing some processing locally, and providing the results of the processing to an external system (external from the module such as a controller, Network Management System (NMS), etc.) such as via a backplane interface, a messaging bus, a Northbound Interface (NBI), etc. Also, the external system can also poll the module for information.

Importantly, there is a vast amount of Performance Monitoring (PM) data or other data (e.g., received symbols, corrected symbols, etc.) available for monitoring which may be captured on each optical module but the majority of which is not provided to the external system in most cases due to bandwidth limitations. For example, the bandwidth limitations are primarily based on a Northbound Interface between a network element (i.e., node or shelf which operates the module) and an orchestrator as the external system (e.g., controller, NMS, etc.), but the bandwidth limitations can also be based on the backplane in the network element for communication between modules, and the like. For example, in an optical network element with tens of transceivers or more, it is not possible to provide all captured optical measurement data to the external system. There is simply too much data. Data may be captured when certain trigger conditions are met. This data conventionally is captured in buffers and written to files, but the vast amount of data limits the number of events which can be stored before the oldest events are discarded, and the storage is overwritten. That said, processing of this data can provide insights, trends, etc. which could be advantageous for proactive performance monitoring and optimization of the optical network.

It would be advantageous to give users an opportunity to use this data as well as other data via user defined applications which execute on the optical modules themselves. However, functionality in the physical networking hardware is fixed by the vendor, and any new functionality must be provided in new product releases, through firmware updates, or via higher layer software platforms (NMS, Software Defined Networking (SDN), control plane, etc.). The higher layer software platforms cannot make use of this vast amount of data since it generally does not leave the module. Vendor implemented firmware updates are possible, but these are slow to implement and cannot account for all possible applications envisioned by the operators. There exists no technique today to provide end users (operators) the ability to execute user defined applications on the networking equipment itself.

BRIEF SUMMARY OF THE DISCLOSURE

In an exemplary embodiment, an optical module adapted to operate in an optical network to perform one or more optical functions therein includes optical components adapted to perform the one or more optical functions; processing circuitry communicatively coupled to the optical components and adapted to obtain data; and compute resources communicatively coupled to the processing circuitry and adapted to receive an application for local execution on the compute resources in a sandboxed manner, and analyze, by the application, the data to perform one or more analysis functions. The sandboxed manner can include the application being constrained to access the data and analyze the data through execution on the compute resources which are isolated from core resources associated with the one or more optical functions. The application can one or more of perform a push to the orchestrator or to another application on the optical module or on another optical module based on analysis, and receive a poll from the orchestrator or from another application on the optical module or on another optical module. The one or more analysis functions can include monitoring and logging specific data, performing calculations based on the data, searching for correlations between the data, and building histograms of the data.

The one or more analysis functions can define one or more error conditions based on the data or calculations derived therefrom. The data can further include data from external sources including other applications running on the optical module, other applications running on other optical modules, and the orchestrator. The compute resources can be further adapted to communicate with an orchestrator based on the one or more analysis functions, and wherein the orchestrator can be executed on one or more of a Network Management System (NMS), an Element Management System (EMS), a Software Defined Networking (SDN) controller, and a server executing an SDN application. The application can be written by an end user separate from a manufacturer or developer of the optical module. The optical module can include one of an optical transceiver, an optical amplifier, an optical switch device, a Wavelength Selective Switch (WSS), an Optical Power Monitor (OPM), a multiplexer/demultiplexer, and any other module or device performing some functionality in the optical network.

In another exemplary embodiment, a method for executing applications on an optical module operating in an optical network to perform one or more optical functions therein includes receiving an application at the optical module for local execution on compute resources associated with the optical module in a sandboxed manner; accessing data by the application, wherein the data is any of generated or obtained by the optical module during operation of the one or more optical functions; and analyzing the data to perform one or more analysis functions through the application executing on the compute resources. The sandboxed manner can include the application being constrained to access the data and analyze the data through execution on resources isolated from core resources associated with the one or more optical functions. The application can perform one or more of performing a push to the orchestrator or to another application on the optical module or on another optical module based on analysis, and receiving a poll from the orchestrator or from another application on the optical module or on another optical module. The one or more analysis functions can include monitoring and logging specific data, performing calculations based on the data, searching for correlations between the data, and building histograms of the data. The one or more analysis functions can define one or more error conditions based on the data or calculations derived therefrom. The method can further include communicating with an orchestrator based on the analyzing, wherein the orchestrator is executed on one or more of a Network Management System (NMS), an Element Management System (EMS), a Software Defined Networking (SDN) controller, and a server executing an SDN application. The application can be written by an end user separate from a manufacturer or developer of the optical module. The optical module can include one of an optical transceiver, an optical amplifier, an optical switch device, a Wavelength Selective Switch (WSS), an Optical Power Monitor (OPM), a multiplexer/demultiplexer, and any other module or device performing some functionality in the optical network.

In a further exemplary embodiment, a processing device executing an orchestrator communicatively coupled to one or more optical modules operating in an optical network includes a network interface and a processor communicatively coupled to one another; and memory storing instructions that, when executed, cause the processor, via the network interface, to interact with applications that are locally executed in a sandboxed manner on compute resources associated with one or more optical modules where those applications serve to analyze data generated or obtained by the one or more optical modules during operation, one or more of i) receive pushed data back from the applications executed on the one or more optical modules and ii) receive polled data back from the applications in responsive to a poll, and perform analysis based on the one or more of receive pushed data and receive polled data, wherein the sandboxed manner includes the application being constrained to access the data and analyze the data through execution on the compute resources which are isolated from core resources associated with one or more optical functions of the optical modules. The memory storing instructions that, when executed, can further cause the processor to coordinate one or more processes where the application and zero or more applications run on the one or more optical modules within the optical network, the application and the zero or more applications are provisioned and the orchestrator combines results from the one or more of receive pushed data and receive polled data for analysis thereof. The memory storing instructions that, when executed, can further cause the processor to transmit and cause instantiation of an application in an optical module for local execution of the application on the optical module.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to user defined applications executed on optical modules for performance monitoring in optical networks. There is a vast amount of data captured in optical modules (e.g., transceivers, amplifiers, wavelength switches, etc.). Systems and methods described herein provide a framework with these modules for deploying end user applications ("apps") executed on the modules using the data capture or other data for performance monitoring and the like. The applications are executed on compute resources on the optical modules with access to the Performance Monitoring (PM) data and other data through Application Programming Interfaces (APIs). End users are allowed to add these applications in the framework, and the applications are segregated such that their operation is non-intrusive to the core functionality performed by the module, i.e., the compute resources are isolated from resources associated with the core functionality. The end users can groom the PM data as needed, monitor for defined events, either log the events or alert an orchestrator, and the like. Such a framework opens up the optical network for sophisticated performance monitoring or other applications leading to proactive network performance monitoring.

The ability to deploy applications onto a network element improves an operator's ability to measure, monitor, control, optimize, and provision the state of their network. Large carriers, and particularly Over The Top (OTT) providers are very motivated to increase their ability to monitor and control their network elements through software, as evidenced by the drive towards SDN. The user defined applications described herein take advantage of data flows that are far too large to aggregate back to a central orchestrator (higher layer controller) for processing outside of a module, line card, optical transceiver, etc. The applications can be programmed to define complex error conditions and to signal the operator when those conditions are satisfied. Enabling operators to run their own software modules in a network element will provide a more detailed picture of the state of the network than would otherwise be possible, leading to proactive maintenance, better performance, etc. Importantly, this framework executes these applications in a sandboxed manner such that the applications do not interfere with the operation of the modules. The applications are executed on compute resources isolated from resources associated with the operation of the module.

Exemplary Optical Network

Figure 1:
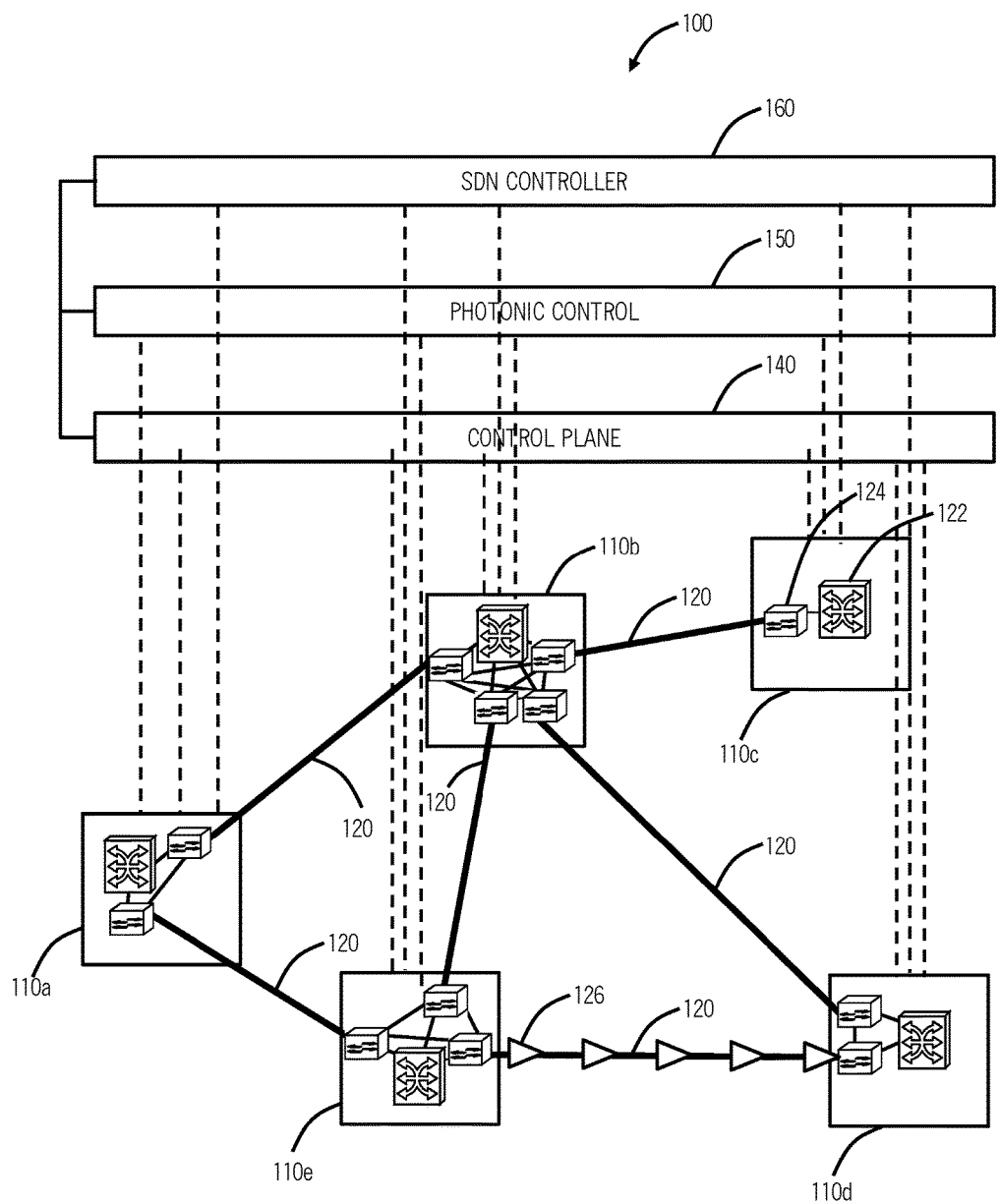
FIG. 1 is a network diagram of an exemplary optical network with five interconnected sites.

Referring to FIG. 1, in an exemplary embodiment, a network diagram illustrates an exemplary optical network 100 with five interconnected sites 110 (labeled as 110a, 110b, 111c, 110d, 110e). The sites 110 are interconnected by a plurality of links 120. Each of the sites 110 can include a switch 122 and one or more WDM network elements 124. The switch 122 is configured to provide services at Layers 1 (e.g., Optical Transport Network (OTN)) and/or Layer 2 (e.g., Ethernet). The WDM network elements 124 provide the photonic layer (e.g., Layer 0) and various functionality associated therewith (e.g., multiplexing, amplification, optical routing, wavelength conversion/regeneration, local add/drop, wavelength switching, etc.) including photonic control. Of note, while shown separately, those of ordinary skill in the switch 122 and the WDM network elements 124 may be realized in the same network element. The photonic layer and the photonic control operating thereon can also include intermediate amplifiers 126 and/or regenerators (which are omitted for illustration purposes) on the links 120. The optical network 100 is illustrated, for example, as an interconnected mesh network, and those of ordinary skill in the art will recognize the optical network 100 can include other architectures, with additional sites 110 or with fewer nodes sites, with additional network elements and hardware, etc. Those of ordinary skill in the art will recognize the systems and methods described herein can be used in any optical networking scenario for the optical network 100, such as data center, metro, regional, long-haul, or submarine applications. The optical network 100 is merely presented for illustration purposes.

Realization of the optical network 100 is via the switch 122, the WDM network elements 124, and/or the amplifiers 126 and with associated optical modules therein. The framework described herein operates with the optical modules in the context of their operation in the optical network 100. Three exemplary optical modules include a transceiver (TX/RX) (also referred to as a transponder, a modem, a line card, etc.), an amplifier (e.g., an EDFA, a Raman amplifier, etc.), and an optical switch (e.g., WSS). Each of these optical modules is adapted to capture a vast amount of PM data related to its corresponding operation (examples are described herein). Again, as described herein, a large amount of the data remains on the optical module and can be lost or written over after a time period (e.g., minutes). The framework described herein enables end user applications distributed to and executed on these optical modules for performing various functions locally with the data. These end user applications execute on compute resources in the optical modules and interface the data via APIs.

The sites 110 are connected with one another optically over the links 120. The sites 110 can be network elements which include a plurality of ingress and egress ports forming the links 120. As described herein, a port may be formed by a transceiver module to provide an optical connection between the sites 110. The optical network 100 can include a control plane 140 operating on and/or between the switches 122 at the sites 110. The control plane 140 includes software, processes, algorithms, etc. that control configurable features of the optical network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an exemplary embodiment, the control plane 140 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the optical network 100 and the control plane 140 can utilize any type control plane for controlling the switches 122 and establishing connections. In an exemplary embodiment, the control plane 140 can support end user application centralized/distributed storage and delivery of applications to optical modules in the switches 122, the WDM network elements 124, the amplifiers 126, etc.

The optical network 100 can include photonic control 150 which can be viewed as a control algorithm/loop for managing wavelengths from a physical perspective at Layer 0. In one aspect, the photonic control 150 is configured to add/remove wavelengths from the links in a controlled manner to minimize impacts to existing, in-service wavelengths. For example, the photonic control 150 can adjust modem launch powers, optical amplifier gain, Variable Optical Attenuator (VOA) settings, WSS parameters, etc. The photonic control 150 can also be adapted to perform network optimization on the links 120. This optimization can also include re-optimization where appropriate. In an exemplary embodiment, the photonic control 150 can adjust the modulation format, baud rate, frequency, wavelength, spectral width, etc. of the dynamic optical transceivers in addition to the aforementioned components at the photonic layer. In an exemplary embodiment, the photonic control 150 can support end user application centralized/distributed storage and delivery of applications to optical modules in the switches 122, the WDM network elements 124, the amplifiers 126, etc.

The optical network 100 can also include a Software Defined Networking (SDN) controller 160. SDN allows management of network services through abstraction of lower level functionality. This is done by decoupling the system that makes decisions about where traffic is sent (SDN control through the SDN controller 160) from the underlying systems that forward traffic to the selected destination (i.e., the physical equipment in the optical network 100). Work on SDN calls for the ability to centrally program provisioning of forwarding on the optical network 100 in order for more flexible and precise control over network resources to support new services. The SDN controller 160 is a processing device that has a global view of the optical network 100. Additionally, the SDN controller 160 can include or connect to SDN applications which can utilize the data from the SDN controller 160 for various purposes. In an exemplary embodiment, the SDN applications can support end user application centralized/distributed storage and delivery of applications to optical modules in the switches 122, the WDM network elements 124, the amplifiers 126, etc.

Figure 2:
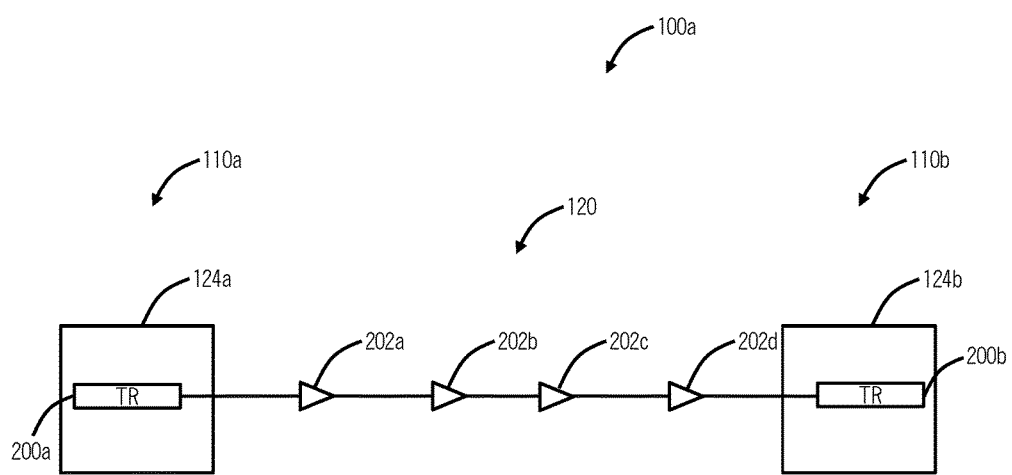
FIG. 2 is a logical network diagram of a subset of the network of FIG. 1 showing two sites with optical modules forming an optical connection.

Referring to FIG. 2, in an exemplary embodiment, a logical network diagram illustrates a subset 100a of the optical network 100 showing the sites 110a, 110b with optical modules 200, 202 forming an optical connection. In an exemplary embodiment, the sites 110a, 110b include the WDM network elements 124a, 124b which each include a transceiver 200a, 200b. On the link 120, various amplifiers 202 (labeled as 202a, 202b, 202c, 202d) are located between the WDM network elements 124a, 124b. Each of the transceivers 200 and the amplifiers 202 are examples of optical modules capable of operating in the framework described herein. The optical connection between the WDM network elements 124a, 124b can be over a wavelength or group of optical spectrum carrying any type of traffic such as, without limitation, OTN, SONET, SDH, Ethernet, Frame Relay, IP, MPLS, and the like as well of combinations thereof.

The links 120 can include any type of optical fiber. For example, the optical fiber can include a useable optical spectrum of 1530 nm to 1565 nm (C-Band). Of course, other portions of the spectrum are contemplated. The optical spectrum can be partitioned into a flexible grid, a fixed grid, gridless, or a combination across the optical spectrum. Thus, each of the links 120 and their associated optical fiber can support a fixed or variable number of wavelengths (wavelengths can also be referred to as optical signals). The wavelengths traverse a channel which carries an underlying service between the sites 110a, 110b. Parameters associated with each of the wavelengths can include—A-Z path in the network, spectrum allocation (e.g., fixed spectrum, flexible spectrum, amount of spectrum, location on the spectrum, etc.), modulation format, baud rate, Forward Error Correction (FEC) parameters, optical power, dispersion compensation, Polarization Mode Dispersion (PMD) compensation, non-linear compensation, polarization state, etc.

Optical Transceivers

Generally, the optical transceiver 200 is associated with the optical signal which is the result of modulating an electrical signal onto an optical carrier. That electrical signal may have a single carrier such as with a single Time Division Multiplexing (TDM) stream of Quadrature Phase Shift Keying (QPSK) symbols, Quadrature Amplitude Modulation (QAM), Higher order modulation formats e.g., X-constellation, a plurality of carriers such as with Frequency-Division Multiplexing (FDM), or a very large number of carriers such as with Orthogonal Frequency-Division Multiplexing (OFDM). Also, the optical transceiver 200 can use polarization multiplexing with any of the foregoing modulation formats. Any type of modulation scheme is contemplated. In an exemplary embodiment, each optical transceiver 200 is tunable so that it can selectively generate a modulated carrier centered at a desired wavelength (or frequency). In exemplary embodiments in which tunable optical transceivers 200 are used, the wavelength range of each optical transceiver 200 may be wide enough to enable the optical transceiver 200 to modulate any wavelength within a region of the optical spectrum such as the C-band. In other exemplary embodiments, the wavelength range of each optical transceiver 200 may be wide enough to enable the modem 200 to generate any one of a subset of wavelengths in the optical spectrum.

The optical transceivers 200 can support various different baud rates through software-programmable modulation formats. The optical transceivers 200 can support programmable modulation or constellations with both varying phase and/or amplitude. In an exemplary embodiment, the optical transceivers 200 can support multiple coherent modulation formats such as, for example, i) dual-channel, dual polarization (DP) binary phase-shift keying (BPSK or X-Constellation) for 100 G at submarine distances, ii) DP-QPSK for 100 G at ultra-long haul distances, iii) 16-QAM for 200 G at metro to regional (600 km) distances, or iv) dual-channel 16 QAM for 400 G at metro to regional distances. In another exemplary embodiment, the optical transceiver 200 can support N-QAM modulation formats with constellation shaping with and without dual-channel and dual-polarization where N can even be a real number and not necessarily an integer. Here, the optical transceiver 200 can support non-standard speeds since N can be an effective real number as opposed to an integer, i.e. not just 100 G, 200 G, or 400 G, but variable speeds, such as 130 G, 270 G, 560 G, etc. These rates could be integer multiples of 10 Gb/s, or of 1 Gb/s.

Furthermore, with Digital Signal Processing (DSP) and software programming of the optical transceiver 200, the capacity of the optical transceiver 200 can be adjusted upwards or downwards in a flexible and hitless manner so as not to affect the guaranteed rate. In other exemplary embodiments, the optical transceiver 200 can include hardware which lacks the aforementioned functionality and thus supports a single modulation format/baud rate which cannot be adjusted (but other parameters that can be adjusted for power, spectral location, etc.). Additionally, the optical transceiver 200 can tune and arbitrarily select spectrum; thus, no optical filters are required. Additionally, the optical transceiver 200 can support various aspects of linear propagation effect mitigation (chromatic and polarization mode dispersion) as well as nonlinear propagation effect mitigation such as self-phase modulation, cross phase modulation, cross-polarization modulation and four-wave mixing in the electrical domain via appropriate DSP, thus eliminating external dispersion compensation devices, filters, etc. The optical transceiver 200 can also adapt the forward error correction coding that is used including Hard Decision FEC implementations and Soft Decision FEC (SD-FEC), as another technique to trade-off complexity versus noise tolerance.

In general, the bit rate of the service provided by a modem is proportional to the amount of spectrum occupied and is a function of the noise tolerance. The optical transceiver 200 can include coherent receivers which require no optical dispersion compensation or optical filters (multiplexers and demultiplexers). Also, the optical transceiver 200 can support advanced Performance Monitoring (PMs) for feedback such as Bit Error Rate (BER), Polarization Dependent Loss (PDL), Polarization Mode Dispersion (PMD), and the like to provide accurate modeling of optical characteristics. The optical transceiver 200 can include coherent transmitters which can provide spectral shaping allowing for more efficient spectrum use and flexible grid placement. Also, the coherent transmitters support software-selectable modulation formats allowing for optimal matching of the formats spectral efficiency to the given link condition.

Figure 3:
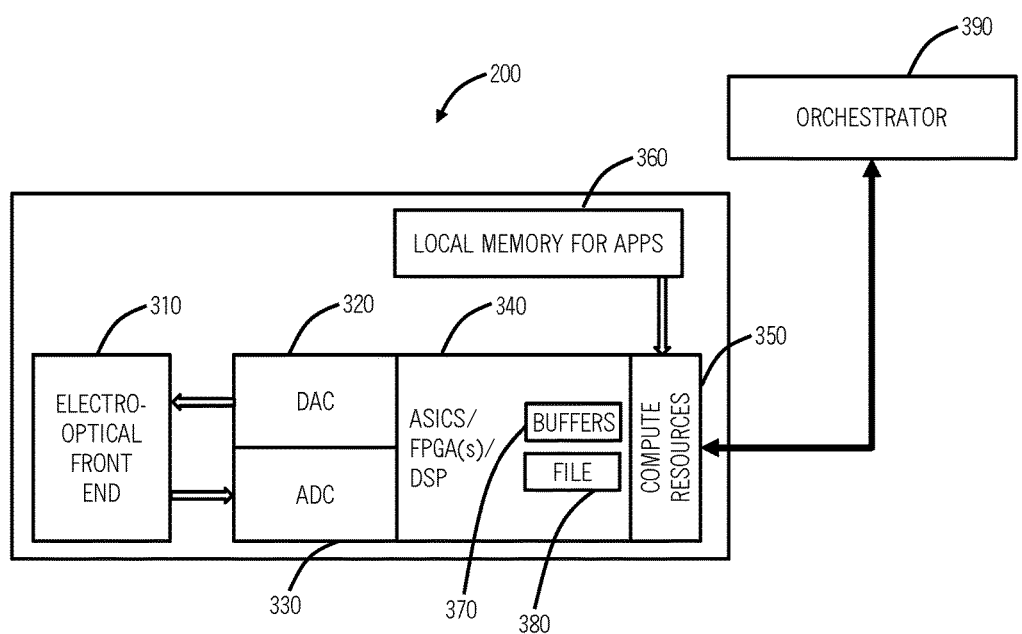
FIG. 3 is a block diagram of functional components of an optical transceiver adapted to execute user defined applications.

Referring to FIG. 3, in an exemplary embodiment, a block diagram illustrates functional components of the optical transceiver 200 adapted to execute user defined applications. The optical transceiver 200 is an integrated hardware device that may be realized as a line card, line module, pluggable module, blade, daughter board, etc. The integrated hardware device includes a form-factor for operation in or with the switches 122, the network elements 124, or the like. Functional components of the optical transceiver 200 include an electro-optical front end 310, a Digital-to-Analog Converter (DAC) 320, an Analog-to-Digital Converter (ADC) 330, processing circuitry 340, compute resources 350, a local memory 360. The electro-optical front end 310 provides conversion between optical and electronic domains. The electro-optical front end 310 includes a transmitter and a receiver. The transmitter generally includes a laser and a modulator. The transmitter is configured to receive a transmit signal from the DAC 320 in analog form to drive the modulator to transmit optically the transmit signal. The receiver can include various detectors, a local oscillator (LO), and polarization components. The receiver receives a received signal optically, performs detection of an electrical signal, and provides an analog electrical signal to the ADC 330 for digital conversion thereof.

The DAC 320 and the ADC 330 provide conversion between electrical signals the analog domain and the digital domain and are connected to processing circuitry 340 for digital signal processing functions. The processing circuitry 340 can include ASICs, FPGAs, DSPs, combinations thereof, as well as other digital processing circuit devices. The processing circuitry 340 is generally configured to perform digital processing on received signals from the electro-optical front end 310 and on transmit signals to the electro-optical front end 310. This digital processing can include various functions such as, without limitation, FEC, dispersion equalization, polarization tracking, modulation/demodulation, non-linear effect compensation, spectral slicing, framing, coherent detection, timing recovery, performance monitoring, and the like. During operation, the processing circuitry 340 obtains various measurements, i.e., PM data, related to any of the aforementioned functions as well as other functions. The data may be stored in buffers 370 (short term memory) which can be written to a file 380 and stored. As described herein, the vast majority of the data is not provided to a higher layer controller via the backplane or northbound interface due to its sheer volume. Note, the buffers 370 and the file 380 can be memory circuits, and, in an exemplary embodiment, the initial data may be written to the buffers 370, then to the file 380, but in the aggregate, the amount of data captured (until written over) is limited. Also, all of the data is not necessarily written into the buffers 370 and then to the file 380, but rather just discarded. A small fraction of it may be captured possibly following some sort of defined trigger event, but the amount of data that can be captured and fed back is limited.

The compute resources 350 include local processing resources on the optical transceiver 200 and can include one or more Central Processing Unit (CPU) cores, FPGAs, Virtual Machines (VMs), etc. The compute resources 350 generally include any device for executing software instructions. In operation, the compute resources 350 are configured to execute software stored within a memory in the compute resources 350 and/or the local memory 360, to communicate data to and from the memory, and to generally perform operations for the compute resources 350 pursuant to the software instructions. The compute resources 350 are communicatively coupled to the buffers 370 and/or the file 380 and configured to access the PM data therein, such as through an API. In another exemplary embodiment, the processing circuitry 340 and the compute resources 350 can share the same hardware.

In various exemplary embodiments, the systems and methods include execution of user defined applications on the compute resources 350 for purposes of performing any functions with the PM data. In an exemplary embodiment, the optical transceiver 200 can include core resources which perform functions related to the operation of the optical transceiver 200. Here, the compute resources 350 are segmented such that operation of the user defined applications does not interfere with the operation of the optical transceiver 200 by isolating the core resources from the compute resources 350, except through APIs or the like which are tightly controlled. Thus, the compute resources 350 can be dedicated to executing the user defined applications, without affecting the on-going operation of the optical transceiver 200.

In an exemplary embodiment, the optical transceiver 200 has access to a large number (thousands) of PMs. The compute resources 350 can be configured to execute the user defined applications with this PM data. An orchestrator 390 could communicate with the optical transceiver 200 through the messaging bus (e.g., NMS, Northbound interface, Data Communications Manager (DCM), etc.) which could upload the user defined applications to the optical transceiver 200. As described herein, the orchestrator 390 can be executed on some higher layer controller, such as an NMS, Element Management System (EMS), SDN controller or application, etc. The orchestrator 390 can facilitate the creation, monitoring, and deployment of resources associated with the user-defined applications described herein. The orchestrator 390 could poll the state of the application (a pull request), or it could wait to be contacted by the module (a push request) when a set of conditions that are defined within the application are met.

Typical functionality for the application could include simple monitoring and logging of PMs, performing calculations based on PM values, training machine learning algorithms by searching for correlations between PMs, building histograms of PM values, etc. Software running on the orchestrator 390 can define a study and then deploy the user defined application containing that study onto one or more modules in a network which will participate in the study. The study can use some combination of PM values or other data to calculate some measure of performance, e.g., polarization activity. At the same time, other modules can be in different studies, e.g., looking for polarization events with a different signature. At any given time, the modules in a network can each be participating in one or more studies. The orchestrator 390 can keep track of this and over a time cycle each study through a number of different modules in the network. In addition to studies, the user defined applications can be used to create new alarms or warnings based on calculations performed on some combination of PM values and their histories. Various other embodiments are contemplated with the PM values. Advantageously, end users or operators can add applications without having to obtain a firmware upgrade, new software release, etc. Further, vendors do not need to be concerned about the quality of the applications because their ability to do harm is limited through providing and the design of the API.

Exemplary User Defined Applications with an Optical Transceiver

Assume the optical transceiver 200 is a coherent optical modem which supports dual polarization transmission. Again, the optical transceiver 200 with the ability to execute user defined applications includes a collection of hardware and software which will enable a network operator to monitor and act upon a large amount of PM data produced by the optical transceiver 200. The coherent optical modem can support functionality which allows the user to monitor one or more PMs and to record the state of a subset of those monitors when one or more of their values crosses predefined threshold values. A user can write an app that runs on the module, e.g., the optical transceiver 200. The app can monitor one or more PMs, perform calculations or other operations on the PM data, and record the state of the PMs and/or the results of those calculations either continuously or when one or more conditions that are defined within the app are satisfied. The logged values or results can be stored and can be downloaded from the optical transceiver 200 by the operator. One example of information that may be available to an app through the API is received symbols and the corresponding ideal symbols that are calculated based on the post-FEC bits that were transmitted by that symbol. These would be available for some fraction of the received symbols.

Using the captured symbols, a multiplicity of measurements are possible such as: 1) the distribution of Bit Error Rate (BER) per half burst; 2) mutual information per half burst; 3) time-dependent polarization; 4) received intensity noise/power fluctuations; 5) phase and amplitude noise statistics; and the like.

In many cases, the PM data has value at the network level for monitoring and optimizing the performance of the network. In a traditional workflow, the triggers on the optical transceiver 200 are set to trigger once a PM reaches a threshold that corresponds to a given condition. Once triggered, the PM values are stored locally and later downloaded by the operator or the orchestrator 390 which performs additional processing and analysis. The challenge with this model is that the trigger events are usually limited to simple threshold crossings, and a large amount of data must be sent back to the Network Operations Center (NOC) for processing. The bandwidth requirements for passing PM data back to the NOC will become more severe for the coherent optical modem where a fraction of all symbols can be available in the form of captured half bursts. In normal operation, it will not be feasible to aggregate that quantity of data to a central location for processing. For example, future modems or optical transceivers 200 will have the ability to capture a small fraction, e.g., 0.1% of the received bursts of symbols, and to relate those symbols to the ideal error-free transmit symbols which are calculated based on the error-free bits following FEC. This data can be processed in a lot of different ways to learn about the condition of the link as well as the optical transceiver 200. Because of the huge volume of data created it will not be possible in most cases to send it to a central location for processing. Calculations performed on this data can be limited to those which can be carried out on the optical transceiver 200, utilizing the systems and methods described herein. Specifically, the use of locally executed user applications allows processing of data in ways that the manufacturer did not define in firmware.

Accordingly, the systems and methods allocate the compute resources 350 for running customer supplied software or applications ("user defined applications") which would have access to a chosen set of PMs through a defined API. The applications can run in a sandboxed environment with access to the PMs as well as the northbound network moderated by the API. By sandboxed environment, operations of the applications in the compute resources 350 do not affect the operation of the optical transceiver 200 (or another type of optical module). This is analogous to apps running on a smartphone where the smartphone allows a subset of its devices such as the accelerometer, magnetometer, microphone, speaker, GPS, screen, etc. to be accessed by user supplied apps running on the phone but where access is limited or controlled to pre-defined devices and resources on the phone.

Again, the systems and methods provide a framework where operators can deploy applications directly into the optical transceiver 200 for the purpose of acting upon data which is available within the optical transceiver 200 or obtained by the optical transceiver 200. This gives the operator the ability to groom and compress the data in a manner that can be specifically tailored to an operator's emerging needs.

The foregoing describe some non-limiting examples of user defined applications. Those of ordinary skill in the art will recognize any type of application is possible to make use of current or future data that is available.

First, with an exemplary optical transceiver 200, one out of every 1000 half bursts will be available to firmware and could be made accessible to an application through an API. For each half burst, the data could include 4 tributaries×9 bits/trib.×256 symbols/HB=9216 bits per half burst with a sniffing rate of one out of every 1000 half bursts giving a total data rate of 0.3 GB/s (@70 GBaud). Again, aggregating this data back to the NOC for processing is not practical. It will also be very difficult to anticipate all of the measurement scenarios that would be of interest to the operator. Possible examples include building up a probability distribution of the BER per half burst or the Mutual Information (MI) per half burst. Accumulated over several hours such a distribution can be used to predict the probability of frame errors. Hundreds of gigabytes of data are reduced to a few kilobytes in the form of a file or other form of data (e.g., data sent via REST commands or other approaches) which can easily be returned to the orchestrator 390, NOC, etc.

Second, the operator can define the characteristics of an event such as a polarization transient and can program an application to identify and parameterize transient events. Using the sniffed data from the previous example, the application can calculate the Stokes space representation of the error field (the difference between received symbol and known transmit symbols) and can monitor the rate of change of that error either within a half burst or comparing between sniffed half bursts. This data could be combined with other measures such as the Least Mean Square (LMS) tap coefficients to quantify the polarization activity associated with the channel. The transient events can be quantified in terms of their magnitude and duration, harmonic content, etc., and logged with a time stamp from a real-time clock that would also be available through the API.

In an exemplary embodiment, the optical transceiver 200 can signal the NOC, the orchestrator 390, etc. when an error condition is satisfied. The optical transceiver 200 could also signal other modules. For example, if one optical transceiver 200 detects a frame error it could signal to the other modules on the link that the event occurred. Apps running on the other module could be programmed to record the state of their PMs or calculated quantities based on their PMs. If a polarization transient is suspected as responsible for one module experiencing a frame error, it would be useful to know if the other modules experienced significant polarization activity at the time of the frame error.

Third, recently machine learning has been used to discover the subtle relations between PMs that are indicative of the health of a coherent modem or network. Again, the optical transceiver 200 has thousands of PMs, so it is not practical to search for relevant correlations by sending all of the data to a central location. Using an application, deep learning algorithms could be instantiated within the optical transceiver 200 and programmed to look for the correlation between a subset of PMs and a measure of performance such as BER. Each optical transceiver 200 in the network can be participating in one of these studies, each with different combinations of data. Over time the combinations of data examined by each optical transceiver 200 can change with a central orchestrator 390 looking for which combinations of monitors proved to have the most relevance for predicting performance. By having a central orchestrator 390 distribute the machine learning activities to a large ensemble of optical transceivers 200 or other optical modules, it should be possible to discover correlations between data much faster than would otherwise be possible.

Fourth, an application could be programmed to monitor the customer traffic payload and to act when specific contents or patterns of activity are observed. Examples include logging the occurrences of packets with some specific header information or bursts of packets of a particular size from a given origin. When a debit terminal processes a transaction its interaction with the bank likely has an identifiable signature; the optical transceiver 200 could be programmed to detect and log those events. Here, the application can extract all or part of the client payload data for processing. Applications include measuring usage from a given origin based on header information, defining a data sequence with a particular signature and logging times when that signature is observed, and the like. This functionality may be used to intercept and store packets from a particular origin for analysis by government agencies.

Fifth, a coherent modem transmits data at a constant rate regardless of whether or not client data is being transmitted. An application could detect empty packets and replace them with data from a buffer. The receiver would place these packets into its buffer and reinstall the empty packets. This mechanism would allow for the transport of low priority data from one modem to another without interfering with customer traffic.

Sixth, applications running on each optical transceiver 200 could be programmed to detect error conditions and to push an alarm to the NOC instead of waiting for the NOC to poll the state of the optical transceiver 200. In this scenario, bandwidth/time is not wasted interrogating optical transceivers 200 which are operating normally. Also, the definition of what constitutes an error condition can be specified in great detail within the application and can continue to evolve along with the operator's knowledge of what matters to the performance of the network.

Variously, the application can perform some local processing or analysis of the data on the optical module or transceiver 200 to reduce the amount of data transmission between the orchestrator 390 and the optical module or transceiver 200, etc. The application can calculate or derive measurements from the PM data and/or the history and present the results in a summarized manner such as a histogram or other type of plot, table, etc. The use of the application can provide results such as histograms or error events to a distributed messaging system such as Apache Kafka.

For the optical transceiver 200, such as a coherent modem, the availability of received symbols and the corresponding error-free bits prior to carrier recovery can enable in-service diagnostic measurements, which can be made available to the end users via the user defined applications described herein. The 'sniffed' received symbols and the corresponding error-free bits (which can be used to get the ideal transmitted constellation points) are one example of the data which could be available to an app through the API. Note, the apps are not limited to performing operations on PM data, but any data associated with the optical transceiver 200 or modules, such as received symbols, corresponding error-free bits, or any other data. Examples of in-service measurements (PM data) include, without limitation, Optical Signal-to-Noise Ratio (OSNR) and Q-factor variations (Q-factor is a known technique for characterizing an optical channel); recording the magnitude, duration, and distribution of polarization transient events; recording the cycle-slip location and frequency within a burst; noise correlation statistics; extracting nonlinear coefficients for use in network simulations; identifying parameters for nonlinear compensation provisioning and budgeting; and the like.

Because measurements are in-service, a large operator may choose to have all of their optical transceivers 200 participating in one or more studies with data aggregated back to the orchestrator 390 to enable network analytics to be used to measure and predict the health of the network.

The data can be sampled at different rates and combined in different ways. For example, an experiment can be designed to look for polarization transients with a certain rotation rate and particular characteristics. That could define one study that could be assigned to a fraction of the modules in an operator's network. Another experiment could look for transients at a different rotation rate or to look to see if they are correlated with some other PM, and this could be assigned to other modules. Thus, a set of studies can be designed and assigned to various modules. These studies could be shuffled over time between the modules. This could be used for machine learning applications where the modules would look for correlations between various PMs and overall performance. For example, an operator could think of all of the PMs that might be related and then define studies to ask a given module to look for correlations between a subset of the PMs and a measure of performance (BER, FER, etc.). Different modules would look at different combinations the orchestrator 390 would monitor the results and occasionally shuffle the studies between the modules.

Again, the orchestrator 390 is adapted to provide the applications to the optical transceiver 200 or optical modules. In an exemplary embodiment, the orchestrator 390 can include a database of applications which can be selected as appropriate or desired by operators and configured and uploaded to optical transceiver 200 or optical modules on the network. The framework can include an application publishing concept where end users can write their own applications and provide to the orchestrator 390, or directly to the modules. Apps can be written by equipment vendors, operators or third parties. The apps are uploaded to and run on the optical transceiver 200 or optical modules. In some cases, the orchestrator 390 is used to upload the app onto the optical transceiver 200 or optical modules. Also, operators can also select applications as well. The applications can be referred to as end user applications in a sense they are written by the end users, not the equipment manufacturer or vendor of the optical transceiver 200 or optical module. Of course, the equipment manufacturer or vendor can also write applications and may offer a suite of applications as well. The key here is that anyone can write an app for the optical transceiver 200 or optical modules and change which apps are running on the optical transceiver 200 or optical modules without having to change the firmware.

Optical Module

Figure 4:
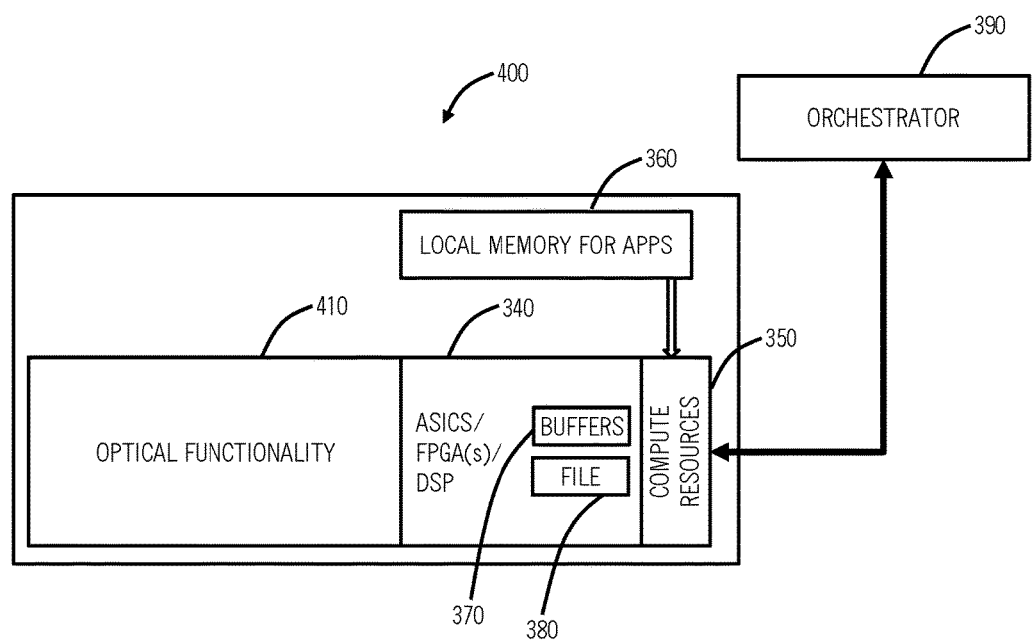
FIG. 4 is a block diagram of functional components of an optical module adapted to execute user defined applications.

Referring to FIG. 4, in an exemplary embodiment, a block diagram illustrates functional components of an optical module 400 adapted to execute user defined applications. The optical module 400 is shown in a general form to represent any type of optical module in a network element (e.g., the network elements 122, 124, 126) that has data captured or obtained and which can execute user defined applications. For example, the optical module 400 can be the optical transceiver 200. Also, the optical module 400 can be an amplifier module (e.g., EDFA, Raman, etc.), a Wavelength Selective Switch (WSS), an Optical Power Monitor (OPM), a multiplexer/demultiplexer, or the like. The optical module 400 operates in a similar fashion as the optical transceiver 200 from the perspective of the user defined applications. Specifically, the optical module 400 includes the processing circuitry 340, the compute resources 350, the local memory 360, the buffers 370, and the file 380. Additionally, the optical module 400 includes optical components 410 to perform some form of optical functionality, e.g., amplification, power monitoring, gain control, modulation/demodulation onto/from an optical carrier, multiplexing/demultiplexing, etc.

In an exemplary embodiment, the optical module 400 is adapted to operate in an optical network to perform one or more optical functions therein. The optical module 400 includes optical components 410 adapted to perform one or more functions associated with the optical module 400; processing circuitry 340 communicatively coupled to the optical components 410 and adapted to obtain data such as data generated or obtained during operation of the one or more optical functions; and compute resources 350 communicatively coupled to the processing circuitry 340 and adapted to receive, such as via an orchestrator 390, an application for local execution on the compute resources 350 in a sandboxed manner, and analyze, by the application, the data to perform one or more analysis functions thereon. The sandboxed manner includes the application being constrained to access the data and analyze the data such that the application does not interfere with the operation of the optical module 400. Specifically, the sandboxed manner refers to an application that executes on the compute resources 350 that are allocated on the optical module 400 for the purpose of running the app, and where the compute resources 350 are isolated from the core resources of the optical module 400 except for those resources which are made available to the app by the hardware vendor or manufacturer either through provisioning or through an API. Resources may include compute, memory, access to performance monitor and other types of data, internal and external network interfaces such as SPI and the northbound network as well as volatile and nonvolatile storage.

The application one or more of pushes data to the orchestrator 390 or to another application on the optical module 400 or on another optical module 400 based on analysis, and receives a poll from the orchestrator 390 or from another application on the optical module 400 or on another optical module 400. The application could also be polled by another application on the same module or a different module or in a more typical scenario it would be polled by the orchestrator 390. Similarly, the application can push or initiate communication with the orchestrator 390 or other apps that can reside on the same module or other modules. The compute resources 350 can be adapted to access the data via an API and wherein the compute resources 350 are adapted to communicate with the orchestrator 390 via a messaging bus associated with a network element housing the optical module 400. The data can be stored in one or more of buffers 370 and a file 380, the PM data can be transient and stored for a temporary period of time. The one or more analysis functions can include monitoring and logging specific data, performing calculations based on the data, searching for correlations between the data, and building histograms of the data. The one or more analysis functions can define one or more error conditions based on the data or calculations derived therefrom. The data can further include data from external sources including other applications running on the optical module 400, other applications running on other optical modules 400, and the orchestrator 390. The orchestrator 390 can be executed on one or more of a Network Management System (NMS), an Element Management System (EMS), a Software Defined Networking (SDN) controller, and a server executing an SDN application. The application can be written by an end user separate from a manufacturer or developer of the optical module 400, although other embodiments are contemplated. The optical module 400 includes one of an optical transceiver 200, an optical amplifier 202, an optical switch device, an Optical Power Monitor (OPM), a multiplexer/demultiplexer, and any other module or device performing some functionality in the optical network.

Framework System for User Defined Applications

Figure 5:
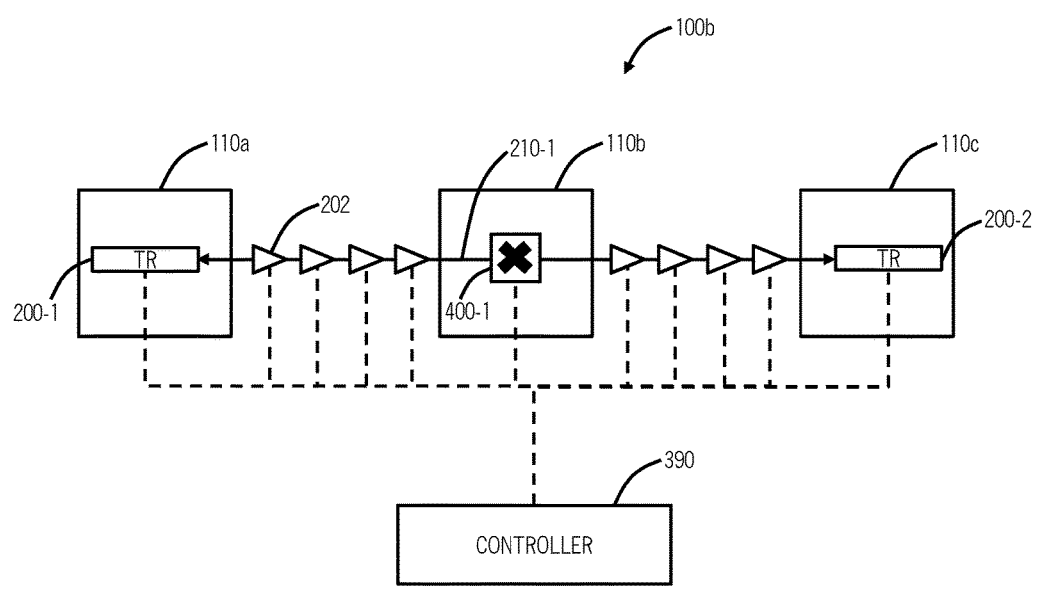
FIG. 5 is a network diagram of a network illustrating three sites with associated modules executing user defined applications and communicating to the orchestrator.

Referring to FIG. 5, in an exemplary embodiment, a network diagram illustrates an optical network 100b including three sites 110a, 110b, 110c with associated modules 200-1, 200-3, 202, 400-1 executing user defined applications and communicating to the orchestrator 390. In this example, there is one channel formed by the optical transceivers 200-1, 200-2 and connected through amplifiers 202 and a WSS optical module 400-1. Of course, other embodiments are also contemplated. Each of these optical modules 200-1, 200-2, 202, 400-1 is configured to execute one or more application(s) as described herein and to communicate with the orchestrator 390. The orchestrator 390 can be executed by an NMS, EMS, SDN controller or application, etc. As described herein, the applications can enable one or more optical modules to participate in studies of the optical channel or the like, such as based on direction and control by the orchestrator 390.

Process for Executing Applications on an Optical Module

Figure 6:
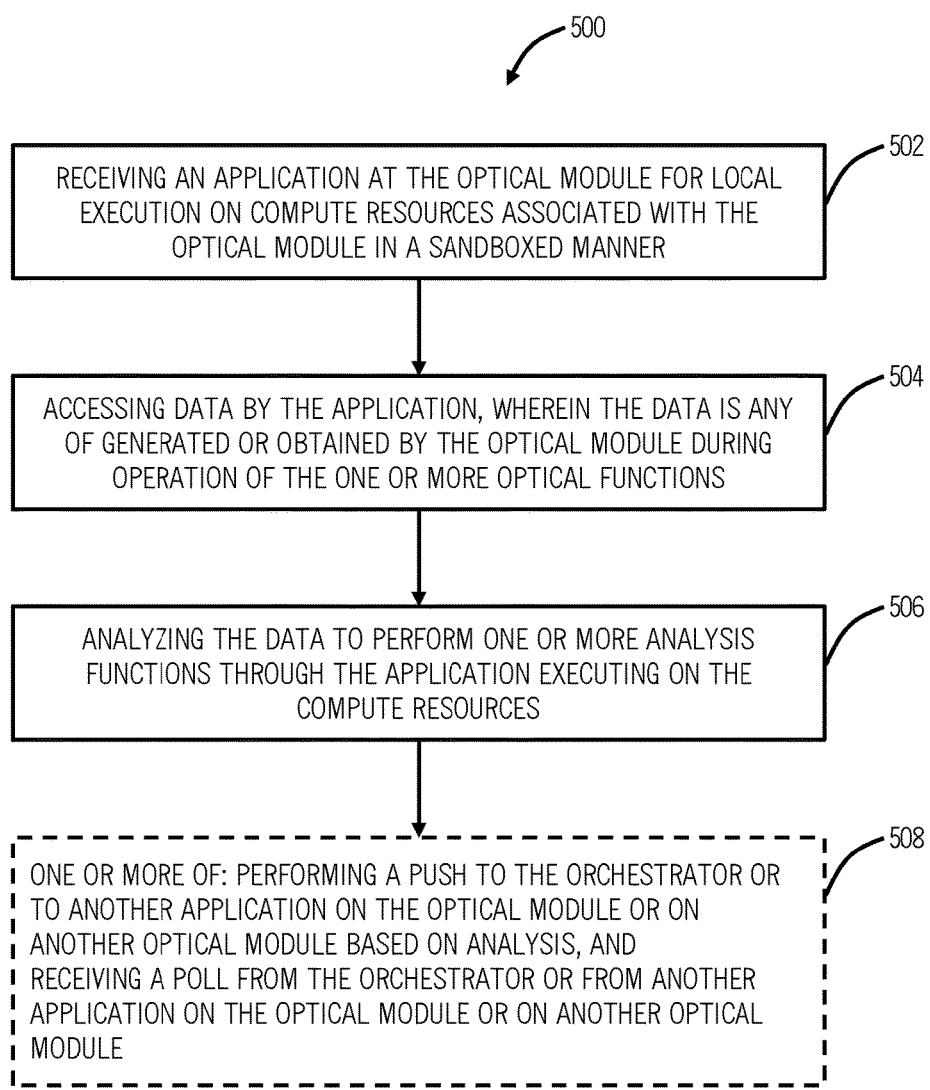
FIG. 6 is a flowchart of a process for executing applications on an optical module.

Referring to FIG. 6, in an exemplary embodiment, a flowchart illustrates a process 500 for executing applications on an optical module 200, 202, 400 which perform one or more optical functions. The process 500 includes receiving an application at the optical module for local execution on compute resources associated with the optical module in a sandboxed manner (step 502); accessing data by the application, wherein the data is any of generated or obtained by the optical module during operation of the one or more optical functions (step 504); analyzing the data to perform one or more analysis functions through the application executing on the compute resources (step 506). As described herein, the data accessed or obtained by the application can be PM data or any other type of data. The sandboxed manner can include the application being constrained to access the data and analyze the data through execution on resources isolated from core resources associated with the one or more optical functions. The application can perform one or more of pushing data to the orchestrator or to another application on the optical module or on another optical module based on analysis, and receiving a poll from the orchestrator or from another application on the optical module or on another optical module (step 508). The one or more analysis functions can define one or more error conditions based on the data or calculations derived therefrom. The data can further include data from external sources including other applications running on the optical module, other applications running on other optical modules, and the orchestrator.

The data can be stored in one or more of buffers and a file; the data can be transient and stored for a temporary period of time. The one or more analysis functions can include monitoring and logging specific data, performing calculations based on the data, searching for correlations between the data, and building histograms of the data. The orchestrator can be executed on one or more of a Network Management System (NMS), an Element Management System (EMS), a Software Defined Networking (SDN) controller, and a server executing an SDN application. The application can be written by an end user separate from a manufacturer or developer of the optical module, although other embodiments are contemplated. The optical module can include one of an optical transceiver, an optical amplifier, an optical switch device, a WSS, OPM, a multiplexer/demultiplexer, and any other module or device performing some functionality in the optical network.

Exemplary Server

Figure 7:
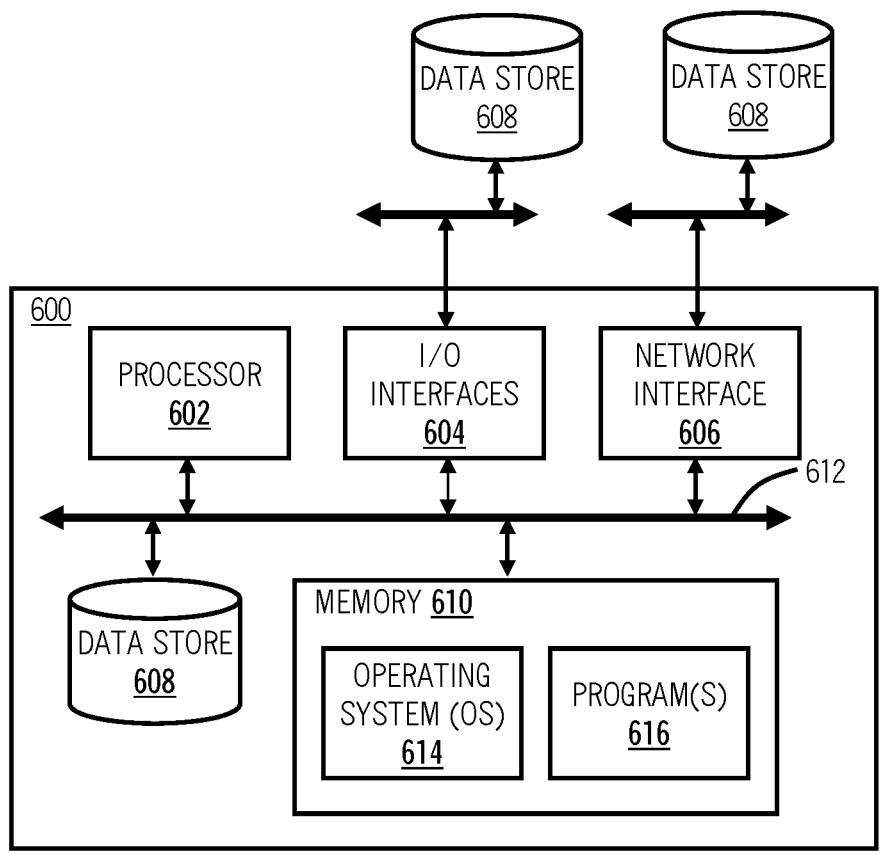
FIG. 7 is a block diagram of an exemplary implementation of a server for implementing the orchestrator.

Referring to FIG. 7, in an exemplary embodiment, a block diagram illustrates an exemplary implementation of a server 600 for implementing the orchestrator 390. The server 600 can be a digital computer that, in terms of hardware architecture, generally includes a processor 602, input/output (I/O) interfaces 604, a network interface 606, a data store 608, and memory 610. It should be appreciated by those of ordinary skill in the art that FIG. 7 depicts the server 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 can be, for example, but not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 can include address, control, and/or data connections to enable appropriate communications among the aforementioned components.

The processor 602 is a hardware device for executing software instructions. The processor 602 can be any custom made or commercially available processor, a central processing unit (CPU), an auxiliary processor among several processors associated with the server 600, a semiconductor-based microprocessor (in the form of a microchip or chip set), or generally any device for executing software instructions. When the server 600 is in operation, the processor 602 is configured to execute software stored within the memory 610, to communicate data to and from the memory 610, and to generally control operations of the server 600 pursuant to the software instructions. The I/O interfaces 604 can be used to receive user input from and/or for providing system output to one or more devices or components. User input can be provided via, for example, a keyboard, touchpad, and/or a mouse. System output can be provided via a display device and a printer (not shown). I/O interfaces 604 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 606 can be used to enable the server 600 to communicate on a network, such as to the network elements and the optical modules 200, 202, 400. The network interface 606 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 606 can include address, control, and/or data connections to enable appropriate communications on the network. A data store 608 can be used to store data. The data store 608 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 can incorporate electronic, magnetic, optical, and/or other types of storage media. In one example, the data store 608 can be located internal to the server 600 such as, for example, an internal hard drive connected to the local interface 612 in the server 600. Additionally, in another embodiment, the data store 608 can be located external to the server 600 such as, for example, an external hard drive connected to the I/O interfaces 604 (e.g., SCSI or USB connection). In a further embodiment, the data store 608 can be connected to the server 600 through a network, such as, for example, a network attached file server.

The memory 610 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 610 can incorporate electronic, magnetic, optical, and/or other types of storage media. Note that the memory 610 can have a distributed architecture, where various components are situated remotely from one another, but can be accessed by the processor 602. The software in memory 610 can include one or more software programs, each of which includes an ordered listing of executable instructions for implementing logical functions. The software in the memory 610 includes a suitable operating system (O/S) 614 and one or more programs 616. The operating system 614 essentially controls the execution of other computer programs, such as the one or more programs 616, and provides scheduling, input-output control, file and data management, memory management, and communication control and related services. The one or more programs 616 may be configured to implement the various processes, algorithms, methods, techniques, etc. described herein.

In an exemplary embodiment, the orchestrator 390, i.e., operating on the server 600, is communicatively coupled to one or more optical modules 200, 202, 400 operating in an optical network. The orchestrator 390 includes a network interface 606 and a processor 602 communicatively coupled to one another; and memory 610 storing instructions that, when executed, cause the processor 602 to, via the network interface 606, interact with applications that are locally executed in a sandboxed manner on compute resources associated with one or more optical modules where those applications serve to analyze data generated or obtained by the one or more optical modules during operation, one or more of i) receive pushed data back from the applications executed on the one or more optical modules and ii) receive polled data back from the applications in responsive to a poll, and perform analysis based on the one or more of receive pushed data and receive polled data, wherein the sandboxed manner can include the application being constrained to access the data and analyze the data through execution on the compute resources which are isolated from core resources associated with one or more optical functions of the optical modules. The memory storing instructions that, when executed, can cause the processor to coordinate one or more processes where the application and zero or more applications run on the one or more optical modules within the optical network, the application and the zero or more applications are provisioned and the orchestrator combines results from the one or more of receive pushed data and receive polled data for analysis thereof.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical module adapted to operate in an optical network to perform one or more optical functions therein, the optical module comprising:
   optical components adapted to perform the one or more optical functions;
   processing circuitry communicatively coupled to the optical components and adapted to obtain data from operation of the optical components; and
   compute resources located in the optical module along with the processing circuitry and the optical components and adapted to
      receive an application for local execution on the compute resources in a sandboxed manner, and
      analyze, by the application, the data to perform one or more analysis functions locally on the data, wherein the data is any of Performance Monitoring (PM) data, received optical symbols, corrected optical symbols, polarization related data, and Bit Error Rate (BER).

2. The optical module of claim 1, wherein the sandboxed manner comprises the application being constrained to access the data and analyze the data through execution on the compute resources which are isolated from core resources associated with the one or more optical functions.

3. The optical module of claim 1, wherein the application one or more of:
   performs a push to an orchestrator or to another application on the optical module or on another optical module based on analysis, and
   receives a poll from the orchestrator or from another application on the optical module or on another optical module.

4. The optical module of claim 1, wherein the one or more analysis functions comprise monitoring and logging specific data, performing calculations based on the data, searching for correlations between the data, and building histograms of the data.

5. The optical module of claim 1, wherein the one or more analysis functions define one or more error conditions based on the data or calculations derived therefrom.

6. The optical module of claim 5, wherein the data further comprises data from external sources comprising other applications running on the optical module, other applications running on other optical modules, and an orchestrator.

7. The optical module of claim 1, wherein the compute resources are further adapted to communicate with an orchestrator based on the one or more analysis functions, and wherein the orchestrator is executed on one or more of a Network Management System (NMS), an Element Management System (EMS), a Software Defined Networking (SDN) controller, and a server executing an SDN application.

8. The optical module of claim 1, wherein the application is written by an end user separate from a manufacturer or developer of the optical module.

9. The optical module of claim 1, wherein the optical module comprises one of an optical transceiver, an optical amplifier, an optical switch device, a Wavelength Selective Switch (WSS), an Optical Power Monitor (OPM), a multiplexer/demultiplexer, and any other module or device performing some functionality in the optical network.

10. A method for executing applications on an optical module operating in an optical network to perform one or more optical functions therein, the method comprising:
    receiving an application at the optical module for local execution on compute resources associated with the optical module in a sandboxed manner;
    accessing data by the application, wherein the data is any of generated or obtained by the optical module during operation of the one or more optical functions, wherein the data is any of Performance Monitoring (PM) data, received optical symbols, corrected optical symbols, polarization related data, and Bit Error Rate (BER); and
    analyzing the data locally in the optical module to perform one or more analysis functions through the application executing on the compute resources.

11. The method of claim 10, wherein the sandboxed manner comprises the application being constrained to access the data and analyze the data through execution on resources isolated from core resources associated with the one or more optical functions.

12. The method of claim 10, wherein the application performs one or more of:
    performing a push to an orchestrator or to another application on the optical module or on another optical module based on analysis, and
    receiving a poll from the orchestrator or from another application on the optical module or on another optical module.

13. The method of claim 10, wherein the one or more analysis functions comprise monitoring and logging specific data, performing calculations based on the data, searching for correlations between the data, and building histograms of the data.

14. The method of claim 10, wherein the one or more analysis functions define one or more error conditions based on the data or calculations derived therefrom.

15. The method of claim 10, further comprising:
communicating with an orchestrator based on the analyzing, wherein the orchestrator is executed on one or more of a Network Management System (NMS), an Element Management System (EMS), a Software Defined Networking (SDN) controller, and a server executing an SDN application.

16. The method of claim 10, wherein the application is written by an end user separate from a manufacturer or developer of the optical module.

17. A processing device executing an orchestrator communicatively coupled to one or more optical modules operating in an optical network, the orchestrator comprising:
a network interface and a processor communicatively coupled to one another; and
memory storing instructions that, when executed, cause the processor, via the network interface, to
interact with applications that are locally executed in a sandboxed manner on compute resources associated with one or more optical modules where those applications serve to analyze data, locally in the one or more optical module, generated or obtained by the one or more optical modules during operation, wherein the data is any of Performance Monitoring (PM) data, received optical symbols, corrected optical symbols, polarization related data, and Bit Error Rate (BER),
one or more of i) receive pushed data back from the applications executed on the one or more optical modules and ii) receive polled data back from the applications in responsive to a poll, and
perform analysis based on the one or more of receive pushed data and receive polled data,
wherein the sandboxed manner comprises the application being constrained to access the data and analyze the data through execution on the compute resources which are isolated from core resources associated with one or more optical functions of the optical modules.

18. The processing device of claim 17, wherein the memory storing instructions that, when executed, cause the processor to
coordinate one or more processes where the application and zero or more applications run on the one or more optical modules within the optical network, the application and the zero or more applications are provisioned and the orchestrator combines results from the one or more of receive pushed data and receive polled data for analysis thereof.

19. The processing device of claim 17, wherein the memory storing instructions that, when executed, cause the processor to
transmit and cause instantiation of an application in an optical module for local execution of the application on the optical module.

* * * * *